(12) United States Patent
Turek (10) Patent No.: US 10,196,120 B2
(45) Date of Patent: Feb. 5, 2019

(54) UNIVERSAL MOUNTING BRACKET FOR OUTBOARD MARINE EQUIPMENT

(75) Inventor: Craig E. Turek, Good Thunder, MN (US)

(73) Assignee: Johnson Outdoors Inc., Racine, WI (US)

( * ) Notice: Subject to any disclaimer, the term of this patent is extended or adjusted under 35 U.S.C. 154(b) by 1593 days.

(21) Appl. No.: 13/483,239

(22) Filed: May 30, 2012

(65) Prior Publication Data

US 2013/0318765 A1 Dec. 5, 2013

(51) Int. Cl.
| | |
|---|---|
| F21V 21/088 | (2006.01) |
| F16C 11/10 | (2006.01) |
| B63H 20/02 | (2006.01) |
| F21V 21/14 | (2006.01) |
| F16C 11/04 | (2006.01) |
| F21V 21/26 | (2006.01) |
| F21V 21/28 | (2006.01) |

(52) U.S. Cl.
CPC .............. *B63H 20/02* (2013.01); *F16C 11/04* (2013.01); *F16C 11/10* (2013.01); *F21V 21/088* (2013.01); *F21V 21/14* (2013.01); *F21V 21/26* (2013.01); *F21V 21/28* (2013.01); *Y10T 29/4984* (2015.01); *Y10T 29/49826* (2015.01)

(58) Field of Classification Search
USPC ............. 248/276.1, 544, 511, 519, 539, 357, 248/354.6, 354.5, 354.4, 637, 503, 640, 248/41, 642, 643; 224/402, 519; 29/434, 29/438, 428
See application file for complete search history.

(56) References Cited

U.S. PATENT DOCUMENTS

| | | | | |
|---|---|---|---|---|
| 2,954,950 A | * | 10/1960 | Hart ............................... | 248/642 |
| 2,965,064 A | * | 12/1960 | Wallace .................. | B63B 21/00 |
| | | | | 114/216 |
| 3,698,672 A | * | 10/1972 | Gilbert .......................... | 248/642 |
| 3,714,619 A | * | 1/1973 | Morgan et al. ................ | 367/173 |
| 3,729,162 A | * | 4/1973 | Salvato ..................... | 248/292.13 |
| 3,785,329 A | * | 1/1974 | Shimanckas .................... | 440/55 |
| 3,948,472 A | * | 4/1976 | Metcalf ......................... | 248/586 |
| 4,013,249 A | * | 3/1977 | Meyer et al. .................. | 248/642 |

(Continued)

FOREIGN PATENT DOCUMENTS

GB 2326345 A * 12/1998 ............... A61C 7/10

OTHER PUBLICATIONS

U.S. Appl. No. 29/423,424, filed May 31, 2012, Craig E. Turek.
U.S. Appl. No. 29/423,429, filed May 31, 2012, Craig E. Turek.
U.S. Appl. No. 29/423,436, filed May 31, 2012, Craig E. Turek.

*Primary Examiner* — Essama Omgba
(74) *Attorney, Agent, or Firm* — Reinhart Boerner Van Deuren P.C.

(57) ABSTRACT

A universal mounting bracket for outboard marine equipment is provided. The universal mounting bracket includes a first member mounted to one end of an arm, and a second member mounted to the other end of the arm. The first and second members mate with the arm to define respective first and second adjustment axes. The arm is adjustable relative to the first member about the first axis. The second member is adjustable relative to the arm about the second axis. Adjustment about the first and second axes allows a user to govern the distance of marine equipment mounted to the second coupling relative to a watercraft.

19 Claims, 6 Drawing Sheets

(56) References Cited

U.S. PATENT DOCUMENTS

| | | | |
|---|---|---|---|
| 4,354,848 A * | 10/1982 | Hall et al. | 440/61 R |
| 4,402,481 A * | 9/1983 | Sasaki | 248/282.1 |
| 4,432,527 A * | 2/1984 | Sample | 248/548 |
| 4,667,915 A * | 5/1987 | Boucher et al. | 248/292.13 |
| 4,787,589 A * | 11/1988 | Willingham | 248/279.1 |
| 4,850,559 A * | 7/1989 | Boucher | 248/286.1 |
| 5,109,364 A * | 4/1992 | Stiner | 367/165 |
| 5,574,700 A * | 11/1996 | Chapman | 367/173 |
| 5,658,177 A * | 8/1997 | Wagner | 440/61 R |
| 6,520,473 B2 * | 2/2003 | Lee | 248/352 |
| 6,652,335 B1 * | 11/2003 | Peschmann et al. | 440/59 |
| 6,722,682 B2 * | 4/2004 | Valliere et al. | 280/405.1 |
| 6,863,253 B2 * | 3/2005 | Valentz et al. | 248/519 |
| 6,896,231 B1 * | 5/2005 | Sullivan, Sr. | 248/311.2 |
| 6,899,574 B1 * | 5/2005 | Kalis et al. | 440/6 |
| 6,953,181 B2 * | 10/2005 | Vodicka | 248/544 |
| 7,044,027 B2 * | 5/2006 | Richter | B25B 13/06 81/121.1 |
| 7,063,297 B2 * | 6/2006 | Jopling | 248/292.12 |
| 7,520,481 B2 * | 4/2009 | Jopling | 248/292.12 |
| 8,424,824 B1 * | 4/2013 | Tan et al. | 248/297.11 |
| 8,777,934 B1 * | 7/2014 | Tan et al. | 606/1 |
| 2003/0042703 A1 * | 3/2003 | Valliere et al. | 280/405.1 |
| 2003/0201289 A1 * | 10/2003 | Swain | 224/519 |
| 2003/0228810 A1 * | 12/2003 | Peschmann et al. | 440/53 |
| 2005/0044769 A1 * | 3/2005 | Ruiz et al. | 43/21.2 |
| 2005/0173356 A1 * | 8/2005 | Vodicka | 211/17 |
| 2005/0279192 A1 * | 12/2005 | Richter | B25B 13/06 81/58.3 |
| 2007/0102607 A1 * | 5/2007 | Koh | 248/276.1 |
| 2008/0179478 A1 * | 7/2008 | Lee | 248/276.1 |
| 2010/0115750 A1 * | 5/2010 | White et al. | 29/407.01 |
| 2011/0278336 A1 * | 11/2011 | Landrum | 224/509 |
| 2012/0214366 A1 * | 8/2012 | Uhlenhopp | 440/65 |

* cited by examiner

UNIVERSAL MOUNTING BRACKET FOR OUTBOARD MARINE EQUIPMENT

FIELD OF THE INVENTION

This invention generally relates to marine equipment, and specifically to mounts for outboard marine equipment.

BACKGROUND OF THE INVENTION

The recreational marine industry has seen significant advancements in the technologies employed in contemporary recreational watercraft. Indeed, many contemporary fishing boats for example may be outfitted with sonar devices for finding fish, gps guidance technology for automatically piloting and positioning a boat, deep and shallow water anchors to broaden the boat's operating environment, etc.

Each of the above technologies may include equipment that in whole or in part is mounted on the outboard side of a boat. As a result, various after-market mounting brackets are required to affix such equipment to the outboard side of the boat. As one example, certain items of marine equipment mount to the transom of a boat via a bracket. As another example, certain items of marine equipment mount to what is referred to in the art as a jack plate which functions as a motor mount between the transom and an outboard motor via a bracket. In either case, there is a significant stratification in the design of transoms and jack plates. As a result, there is also a significant stratification in the design of mounting brackets that will accommodate the various transom and jack plate designs. Indeed, in some cases a single item of marine equipment can be associated with a multitude of mounting brackets so that the equipment may operate with various boat models.

Unfortunately, manufacturing a variety of mounting brackets for a single piece of equipment drives up the cost of manufacturing, and ultimately, the cost on the consumer side of the particular equipment and mount the consumer desires to purchase to outfit their particular boat. Therefore, there is a need in the art for a mounting bracket that can accommodate various hull geometries so as to reduce the number of mounting brackets that would otherwise be associated with a single piece of equipment.

The invention provides such a mounting bracket. These and other advantages of the invention, as well as additional inventive features, will be apparent from the description of the invention provided herein.

BRIEF SUMMARY OF THE INVENTION

In one aspect, a mounting bracket for mounting outboard marine equipment to a watercraft is provided. A mounting bracket according to this aspect includes a first member, a portion of which is configured to mount to a motor mount of the watercraft. The mounting bracket also includes an arm having a first and second end. The first member is coupled to the arm at the first end to define a first axis of adjustment. The mounting bracket also includes a second member which provides a mounting surface for mounting outboard marine equipment to the second member. The second member is coupled to the arm of the second end thereof to define a second axis of adjustment. The arm is adjustable relative to the first member about the first axis to one of a plurality of adjustment positions. The second member is adjustable relative to the arm about the second axis to one of a plurality of adjustment positions.

The first member includes a connection portion with a bore extending therethrough, and a flange extending away from the connection portion. The connection portion is received in a first clamping portion of the arm at the first end thereof. The flange portion defines a mounting surface for mounting the mounting bracket to the watercraft.

The connection portion includes a plurality of adjustment teeth formed on an exterior thereof. The first clamping portion includes a recess for receiving the connection portion with a plurality of adjustment teeth formed therein. The adjustment teeth of the connection portion and the adjustment teeth of the recess define the plurality of discrete adjustment positions of the arm relative to the first member.

At least one pair of aligned slots are formed through the connection portion. At least one pair of aligned apertures are formed through the first clamping portion. The at least one pair of aligned apertures are alignable with the at least one pair of aligned slots along a mounting axis. The mounting bracket further comprises a mounting bolt extending through the at least one pair of aligned slots and the at least one pair of aligned apertures along the mounting axis. The mounting bolt is radially fixed when received in the at least one pair of aligned apertures. The mounting bolt is slideable in a circumferential direction within each of the at least one pair of aligned slots.

The second member includes a connection portion with a bore extending therethrough, and a flange portion extending away from the connection portion. The connection portion is received in a second clamping portion of the arm at the second end thereof. The flange portion defines a mounting surface for mounting outboard marine equipment thereto.

The connection portion of the second member includes a plurality of adjustment teeth formed on an exterior thereof. The second clamping portion includes a recess for receiving the connection portion of the second member with a plurality of adjustment teeth formed therein. The adjustment teeth of the connection portion of the second member and the adjustment teeth of the recess define the plurality of discrete adjustment positions of the second member relative to the arm.

At least one pair of aligned slots are formed through the connection portion. At least one pair of aligned apertures are formed through the second clamping portion. The at least one pair of aligned apertures are alignable with the at least one pair of aligned slots along a mounting axis. A mounting bolt extends through the at least one pair of aligned slots and the at least one pair of aligned apertures along the mounting axis. The mounting bolt is radially fixed when received in the at least one pair of aligned apertures. The mounting bolt is slideable in a circumferential direction within each of the at least one pair of aligned slots.

In another aspect, a mounting bracket for mounting outboard marine equipment to a watercraft is provided. An embodiment of the mounting bracket includes a first member, a portion of which is configured to mount to a motor mount of the watercraft. The mounting bracket also includes an arm having a first and second end. The first member is coupled to the arm at the first end to define a first axis of adjustment. The arm is incrementally adjustable relative to the first member through rotation of the arm about the first axis. The mounting bracket also includes a second member which provides a mounting surface for mounting outboard marine equipment to the second member. The second member is coupled to the arm at the second end of the arm to define a second axis of adjustment. The second member is incrementally adjustable relative to the arm through rotation of the second member about the second axis. One increment of adjustment of the arm relative to the first member about the first axis angularly displaces the arm relative to the first member a first angular value. One increment of adjustment of the second member relative to the arm about the second axis angularly displaces the second member relative to the arm a second angular value that is equivalent to the first angular value.

Each of the first member and the first end of the arm include a plurality of adjustment teeth configured and meshed together to define a plurality of incrementally adjustable positions of the arm relative to the first member. At least one mounting bolt connects the first member to the first end of the arm. The at least one mounting bolt extends through both the first member and the arm.

Each of the second member and the second end of the arm include a plurality of adjustment teeth configured to mesh together to define a plurality of incrementally adjustable positions of the second member relative to the arm. At least one mounting bolt connects the second member to the second end of the arm. The at least one mounting bolt extends through both the second member and the arm.

In yet another aspect, a method for mounting an item of outboard marine equipment to a water craft using a mounting bracket is provided. An embodiment of this method includes mounting a first end of the mounting bracket to a portion of the watercraft. The method also includes mounting the item of outboard marine equipment to a second end of the mounting bracket. Thereafter, an arm of the mounting bracket is angularly adjusted relative to a first member of the mounting bracket about a first axis. The method also includes angularly adjusting a second member of the mounting bracket relative to the arm about a second axis to position the item of outboard marine equipment at a fixed distance relative to the watercraft.

In certain embodiments, the step of mounting the first end includes mounting the first member such that it is in contact with a motor mount of the watercraft. In certain other embodiments, the step of mounting the first end includes mounting the first member such that it is in contact with at least one of a motor mount and a transom of the watercraft.

The step of angularly adjusting the arm relative to the first member includes bringing a plurality of adjustment teeth of the first member into meshed engagement with a plurality of adjustment teeth of the arm.

The step of angularly adjusting the second member relative to the arm includes bringing a plurality of adjustment teeth of the second member into meshed engagement with a plurality of adjustment teeth of the arm.

In yet another aspect, a mounting bracket for mounting outboard marine equipment to a watercraft is provided. An embodiment of such a mounting bracked includes an angularly adjustable member, the angularly adjustable member including a mounting surface configured for receiving at least one item of marine equipment, wherein the angularly adjustable member is angularly adjustable about an adjustment axis to govern an angular orientation of the at least one item of marine equipment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
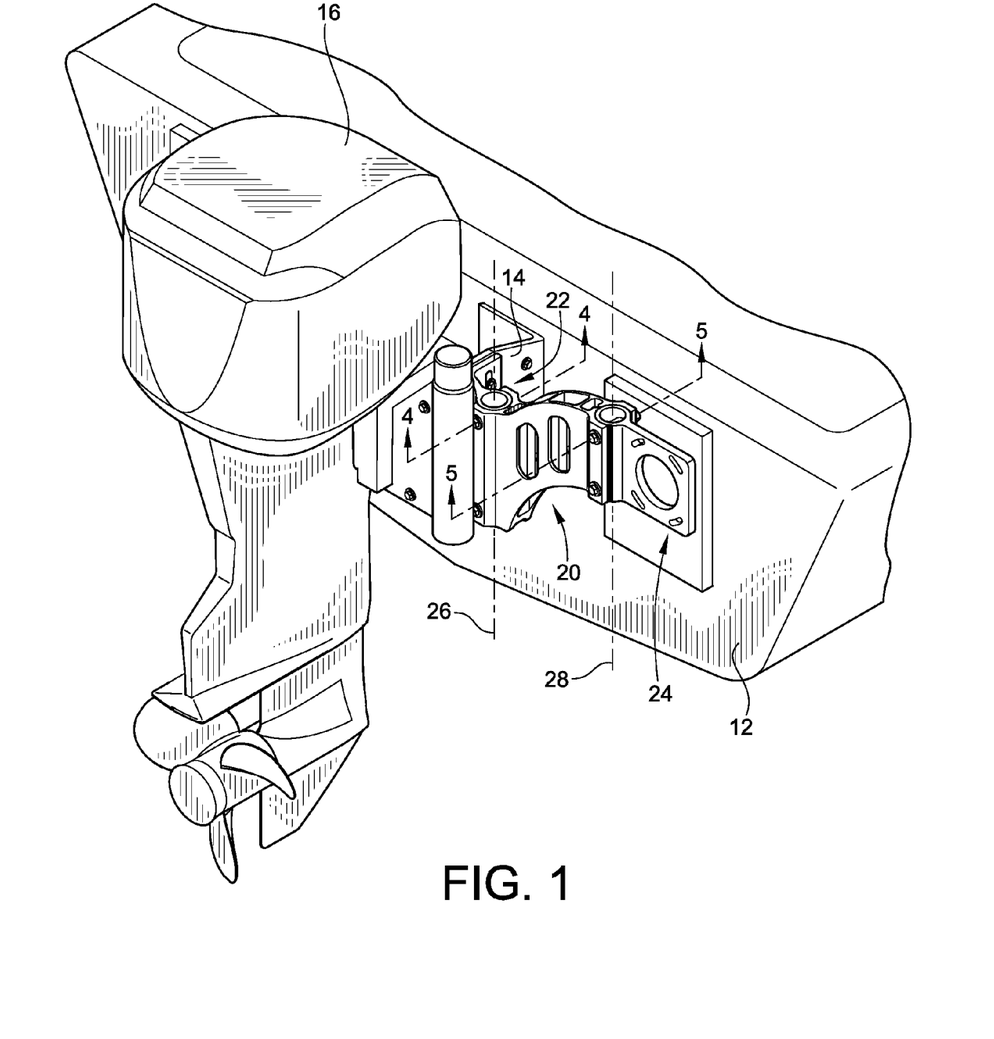
FIG. 1 is a partial perspective view of a boat with a first embodiment of a mounting bracket according to the teachings of the present invention mounted to a jack plate of the boat.

Turning now to the drawings, and with particular reference to FIG. 1, the transom 12 of a conventional watercraft is illustrated. A jackplate 14 extends from the transom 12. An outboard motor 16 is affixed to the jackplate 14 such that it is positioned a distance away from the transom 12. An embodiment of a mounting bracket 20 according to the teachings of the present invention is also illustrated mounted at a first end 22 thereof to the jackplate 14. The mounting bracket 20 is configured at its second end 24 to receive a variety of outboard marine equipment.

As will be described in greater detail below, the mounting bracket 20 is adjustable about first and second axes 26, 28 to ultimately position equipment attached to the second end 24 of mounting bracket 20 a minimum clearance or operating distance away from transom 12. This minimum or operating distance will be referred to herein as a "setback distance." Such a configuration advantageously permits use of mounting bracket 20 with various transom 12 and jackplate 14 geometries. More specifically, adjustment of mounting bracket 20 about first and second axes 26, 28 allows a user to maintain a desired setback distance and/or angular orientation for a particular piece of outboard marine equipment mounted to mounting bracket 20 regardless of the particular transom 12 and/or jackplate configuration of the user's boat. In the illustrated embodiment, the mounting bracket 20 is illustrated extending from the starboard side of the jackplate 14. However, the illustrated embodiment of mounting bracket 20 is reversible such that it can also extend from the port side of the jackplate 20. Such functionality provides for greater flexibility when selecting a mounting location for mounting bracket 20, especially when a user already has other outboard equipment in use.

Figure 2:
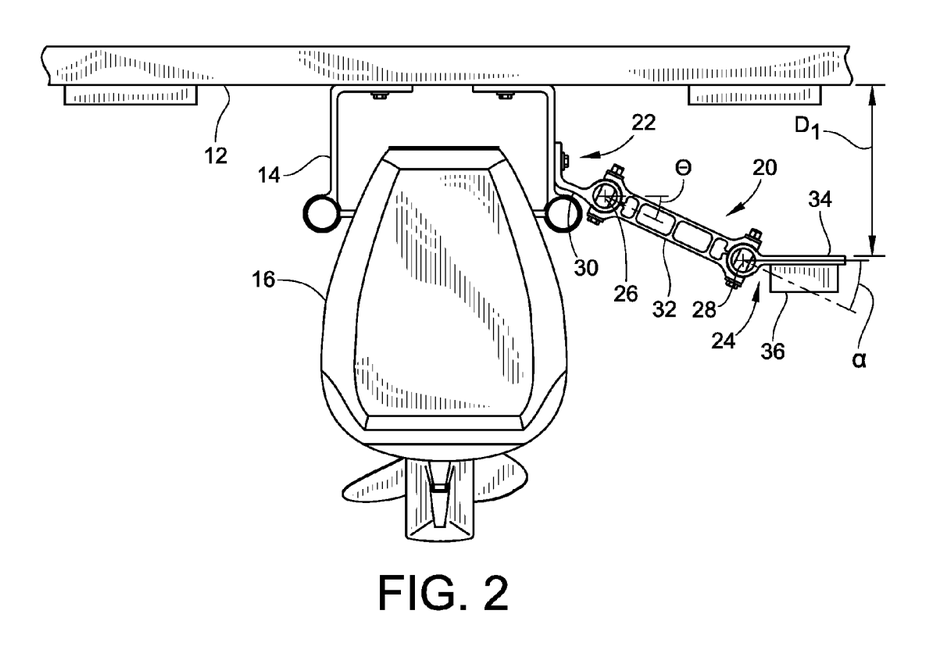
FIG. 2 is a top view of the mounting bracket of FIG. 1.

Turning now to FIG. 2, a top view of mounting bracket 20 is shown to illustrate the aforementioned adjustability in greater detail. An item of outboard marine equipment 36 is illustrated mounted to second end 24 of mounting bracket 20. Marine equipment 36 can take on a variety of forms, e.g. a sensor, an anchor, trolling line, etc. As such, the particular item of marine equipment 36 is not limiting in any way on the invention herein, and is thus shown schematically. Adjustment of mounting bracket 20 about first and second axes 26, 28 governs the setback distance D1 of marine equipment 36 relative to the outer most extent of transom 12. It will be recognized by those skilled in the art that because the particular shape and design of a transom will vary with the particular model of boat associated therewith, so too will the required setback distance D1 to maintain marine equipment 36 at a minimum clearance or operating distance relative to transom 12. As a result, the adjustability of mounting bracket 20 advantageously allows for mounting bracket 20 to operate as a universal mounting bracket which can accommodate various transom 12 and/or jackplate 14 configurations, while maintaining a desired setback distance D1.

Mounting bracket 20 includes first member 30 which defines first end 22 of mounting bracket 20. Mounting bracket 20 also includes arm 32 which extends from first member 30. Second member 34 is attached to arm 32 at an end thereof opposite the end of arm 32 which attaches to first member 30.

First member 30 and arm 32 are coupled to one another and define the first axis 26 of adjustment (See also FIG. 1). Arm 32 is adjustable about first axis 26 to govern the value of an angle θ formed between a reference horizontal plane as shown in FIG. 2 and the longitudinal axis of arm 32. The reference horizontal plane is generally parallel to a horizontal plane containing the outer most feature of transom 12 such that θ represents the angular orientation of arm 32 relative to transom 12.

Similarly, second member 34 and arm 32 are coupled to one another to define the second axis 28 of adjustment (See also FIG. 1). Second member 34 is adjustable about second axis 28 to govern an angle α formed between a horizontal reference plane and the longitudinal axis of arm 32. In practice, a user can adjust arm 32 about first axis 26 to increase or decrease the angle θ to generally achieve a setback distance that is close to or the same as the required setback distance required for the particular item of marine equipment 36 mounted to mounting bracket 20. A user can also adjust second member 34 about second axis 28 relative to arm 32 to maintain parallelism (or any desired angle) between a back surface of second member 34 and the outer most feature of transom 12 to ultimately fine-tune or achieve the precise setback distance D1.

Figure 3:
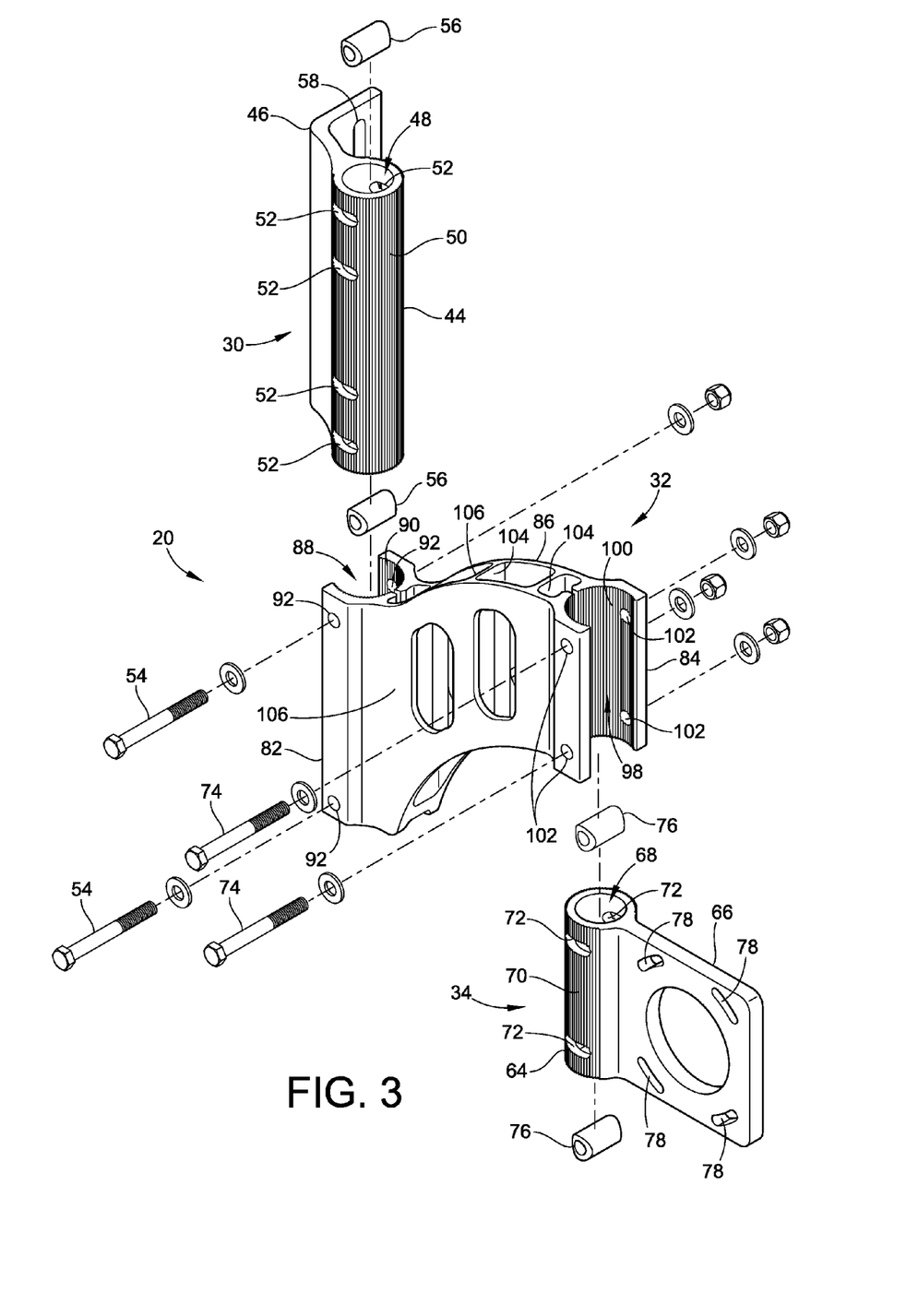
FIG. 3 is an exploded perspective view of the mounting bracket of FIG. 1.

Turning now to FIG. 3, the various components of mounting bracket 20 will be described in greater detail. First member 30 includes a connection portion 44 and a flange portion 46 extending from connection portion 44. Connection portion 44 is generally sleeve-shaped and includes a bore 48 therethrough, however, it will be recognized that connection portion 44 may take on different shapes in other embodiments other than the cylindrical shape illustrated. A plurality of adjustment teeth 50 are formed on an outer periphery of connection portion 44. A plurality of slots 52 are formed through connection portion 44. Slots 52 are aligned on either side of connection portion 44 so that connection portion 44 may receive mounting bolts 54 therethrough. Mounting bolts 54 also pass through bushings 56 that are aligned with respective slots 52 within bore 48. Bushings 56 have rounded ends so that they may maintain surface contact with the generally round periphery of bore 48. Although illustrated using bushings 56, bushings 56 are not necessary for the functionality of mounting bracket 20 and can thus be omitted.

Flange portion 46 is generally L-shaped, in the illustrated embodiment. Flange portion 46 includes elongated slots 58 for mounting flange portion 46 to jackplate 14 as shown in FIGS. 1 and 2, or any other generally flat surface of a watercraft. The particular geometry and location of slots 58 may vary depending on application. However, the illustrated embodiment allows for the accommodation of various mounting hole patterns. Furthermore, flange portion 46 may take on other shapes, other than the L-shape illustrated, e.g. T-shaped, etc.

Second member 34 includes a connection portion 64 and a flange portion 66 extending from connection portion 64. Connection portion 64 is generally sleeve-like in shape with a bore 68 extending therethrough, however, it will be recognized that connection portion 64 may take on different shapes in other embodiments other than the cylindrical shape illustrated. A plurality of adjustment teeth 70 are formed on an outer surface of connection portion 46. A plurality of slots 72 are formed through connection portion 64. Slots 72 are aligned on either side of connection portion 64 so that mounting bolts 74 can extend entirely through connection portion 64. A pair of bushings 76 are positioned within bore 68 and aligned with slots 72 so that mounting bolts 74 extend through slots 72 and bushings 76 when passing through connection portion 64. Bushings 76 have generally rounded ends which match the periphery of bore 68 so that bushings 76 maintain surface contact with bore 68 when positioned therein. Although illustrated using bushings 76, bushings 76 are not necessary for the functionality of mounting bracket 20 and can thus be omitted.

Flange portion 66 is generally flat in shape. Flange portion 66 includes elongated slots 78 for mounting outboard marine equipment 36 (See FIG. 2) as shown in FIG. 2 on either side of second member 34. The particular geometry and location of slots 78 may vary depending on application. The illustrated embodiment allows for the accommodation of various mounting hole patterns. Further, flange portion 66 may be elongated to incorporate multiple hole patterns formed by multiple slot 78 arrangements, so as to allow for mounting of multiple items of marine equipment 36 simultaneously.

Arm 32 includes a first clamping portion 82, a second clamping portion 84, and an intermediary portion 86 extending therebetween. First clamping portion 82 has a recess or opening 88 extending therethrough for receipt of connection portion 44 of first member 30. Plurality of adjustment teeth 90 are formed on an interior of recess 88 as illustrated. Adjustment teeth 90 are disposed in recess 88 to mesh with adjustment teeth 50 of connection portion 44 of first member 30, as explained in greater detail below. First clamping portion 82 also includes a plurality of apertures 92. Select ones of apertures 92 are aligned with one another on first clamping portion 82 so that mounting bolts 54 can extend entirely through first clamping portion 82. Indeed, when connection portion 44 of first member is received within recess 88, apertures 92 are alignable with select ones of slots 52 as well as bushings 54 so that mounting bolts 54 may pass entirely through each of first clamping portion 82, connection portion 44, and bushings 56.

When connection portion 44 is installed in recess 88, a top edge of first member 30 is flush with a top edge of first clamping portion 82. Such orientation is achieved by aligning the upper most apertures 92 of first clamping portion 82 with the upper most slots 52 of connection portion 44 illustrated in FIG. 3. The lower most apertures 92 will then be aligned with the second to lower most slots 52 of connection portion 44. Connection portion 44 includes an additional pair of slots 52 so that first member 30 may be installed on the left side of jackplate 14 in FIG. 1 as opposed to the right side installation configuration shown therein. In other words, by affixing the first member 30 to the other side of jackplate 14 of FIG. 1, the other pair of slots 52 will be utilized to insure that the top edge of first member 30 is flush with a top edge of first clamping portion 82. Therefore, by use of multiple slots 52, the embodiment illustrated in FIG. 3 may be utilized in right side or left side jackplate 14 mounting.

Second clamping portion 84 also includes a recess or opening 98 formed therein. A plurality of adjustment teeth 100 are formed within recess 98 and mesh with adjustment teeth 70 formed on connection portion 64 of second member 34. Second clamping portion 84 also includes a plurality of apertures 102. Select ones of apertures 102 are aligned with one another so that mounting bolt 74 can pass entirely through second clamping portion 84. Apertures 102 are alignable with slots 72 formed on connection portion 64 of second member 34 as well as bushing 76 so that mounting bolts 74 extend entirely through each of second clamping portion 84, connection portion 64, and bushing 76.

Intermediary portion 86 positioned between first and second clamping portions 82, 84 is generally rigid in structure. The particular embodiment illustrated includes a plurality of horizontal support members 104 which extend between longitudinal support members 106 that connect the first clamping portion 82 to the second clamping portion 84. Although illustrated as having a generally arcuate shape, intermediary portion may be non-curved or straight in other embodiments. Indeed, those skilled in the art will recognize that the intermediary portion 86 can take on a variety of forms while still permitting the functionality of mounting bracket 20 as described herein. The various components of mounting bracket 20 described in FIG. 3 may be manufactured from any structurally rigid material, e.g. plastics, metals, composites, etc. Furthermore, the various components of mounting bracket 20 may be manufactured from any contemporary manufacturing process including but not limited to casting, injection molding, machining, or any combination thereof.

Figure 4:
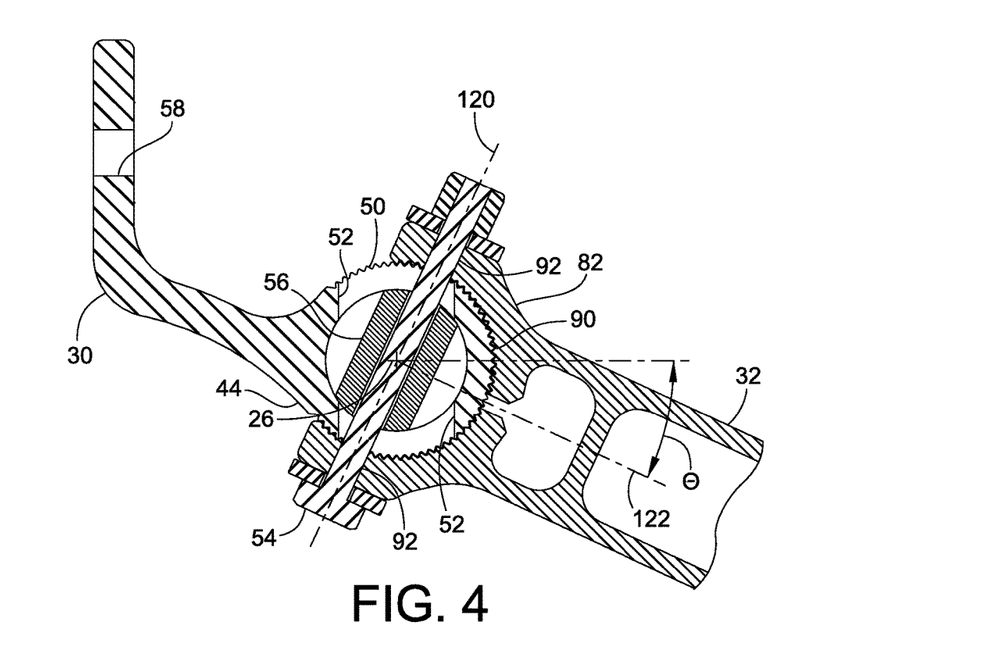
FIG. 4 is a top cross sectional view of the mounting bracket of FIG. 1.

Having discussed the basic structural attributes of an embodiment of mounting bracket 20, a description will now be provided for the interaction between first member 30 and arm 32 as well as second member 34 and arm 32 during adjustment. With particular reference to FIG. 4, a partial cross-sectional view of the connection between first member 30 and arm 32 is illustrated. As shown, adjustment teeth 50 of first member 30 are in meshing contact with adjustment teeth 90 of first clamping portion 82 of arm 32. Adjustment teeth 50, 90 define a plurality of discrete adjustment positions of arm 32 relative to first member 30. In other embodiments, however, adjustment teeth 50, 90 could be omitted and the surface contact alone between connection portion 44 and first clamping portion 82 would be sufficient to maintain the angle θ.

After removing mounting bolts 54, arm 32 can be axially slid off of connection portion 44 in a generally vertical direction (See FIG. 3), and thereafter rotated or repositioned about first axis 26 to change angle θ as shown in FIG. 4. Once a desired angle θ is achieved, arm 32 is slid back down on connection portion 44 and mounting bolts 54 are replaced and re-tightened so as to bring adjustment teeth 90 of first clamping portion 82 back into tight meshing contact with adjustment teeth 50 of first member 30.

In another embodiment, the clearances between the outer periphery of connection portion 44 and first clamping portion 82 may be large enough to permit adjustment of arm 32 relative to first member 30 without entirely removing arm 32 from connection portion 44. Indeed, first clamping portion 82 can be manufactured with enough clearance and flexibility so as to allow for the aforementioned adjustment and re-tightening to fix the position of arm 32 relative to first member 30 in a ratcheting type configuration. More specifically, first clamping portion 82 is flexible so that as mounting bolts 54 are loosened, adjustment teeth 50 come partially or entirely out of full meshing contact with adjustment teeth 90 to allow for rotation of arm 32 relative to first member 30.

As shown in FIG. 4, mounting bolt 54 is constrained along an axis 120 defined by aligned apertures 92 of first clamping portion 82. Despite this constraint, however, slots 52 formed in connection portion 44 of first member 30 allow for mounting bolt 54 to rotate about first axis 26 over a range of angular positions generally defined by the width of slots 52. In other words, while the generally right angle formed between axis 120 and longitudinal axis 122 of arm 32 remains fixed, the width of slots 52 allows for the variation of angle θ as illustrated in FIG. 4. With momentary reference back to FIG. 2, incrementally changing angle θ operates to roughly set distance D1 of second end 24 of mounting bracket 20 from transom 12. Returning back to FIG. 4, the size of slots 52 as well as the amount of adjustment teeth 50 provided on the exterior of connection portion 44 ultimately define the range of angles θ that arm 32 may be adjusted relative to first member 30.

Figure 5:
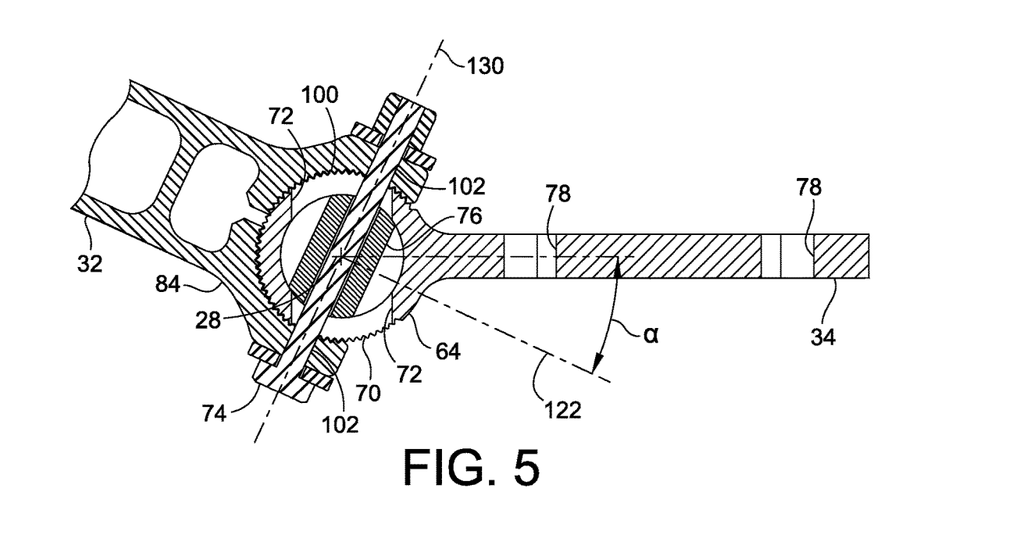
FIG. 5 is a top cross sectional view of the mounting bracket of FIG. 1.

Turning now to FIG. 5, a cross-section of mounting bracket 20 is illustrated at the point of connection of second member 34 to arm 32. As shown, adjustment teeth 70 of second member 34 are in meshing contact with adjustment teeth 100 of second clamping portion 84 of arm 32. Adjustment teeth 70, 100 define a plurality of discrete adjustment positions of second member 34 relative to arm 32. In other embodiments, however, adjustment teeth 70, 100 could be omitted and the surface contact alone between connection portion 64 and first clamping portion 84 would be sufficient to maintain the angle α.

After removing mounting bolts 74, second member 34 can be axially slid off of second clamping portion 84 in a generally vertical direction (See FIG. 3) and thereafter rotated or repositioned about second axis 28 to change angle α as shown in FIG. 5. Once a desired angle α is achieved, second member 34 is slid down into second clamping portion 84, and mounting bolts 74 are replaced and re-tightened so as to bring adjustment teeth 100 of second clamping portion 84 back into meshing contact with adjustment teeth 70 of second member 34.

In another embodiment, the clearances between the outer periphery of connection portion 64 and second clamping portion 84 may be large enough to permit adjustment of second member 34 relative to arm 32 without entirely removing second member 34 from arm 32. Indeed, second clamping portion 84 can be manufactured with enough clearance and flexibility so as to allow for the aforementioned adjustment and re-tightening to fix the position of second member 34 relative to arm 32 in a ratcheting type configuration. More specifically, second clamping portion 84 is flexible so that as mounting bolts 74 are loosened, adjustment teeth 70 come partially or entirely out of full meshing contact with adjustment teeth 100 to allow for rotation of second member 34 relative to arm 32.

As shown in FIG. 5, mounting bolt 74 is constrained along an axis 130 defined by aligned apertures 102 of second clamping portion 84. Despite this constraint, however, slots 72 formed in connection portion 64 of second member 34 allow for mounting bolt 74 to rotate about second axis 28 over a range of angular positions generally defined by the width of slots 72. In other words, while the generally right angle formed between axis 130 and longitudinal axis 122 of arm 32 remains fixed, the width of slots 72 allows for the variation of angle α as illustrated in FIG. 5. With momentary reference back to FIG. 2, incrementally changing angle α operates finely adjust distance D1 of second end 24 of mounting bracket 20 from transom 12. Returning back to FIG. 5, the size of slots 72 as well as the amount of adjustment teeth 70 provided on the exterior of connection portion 64 ultimately define the range of angles α that second member 34 may be adjusted relative to arm 32.

Figure 6:
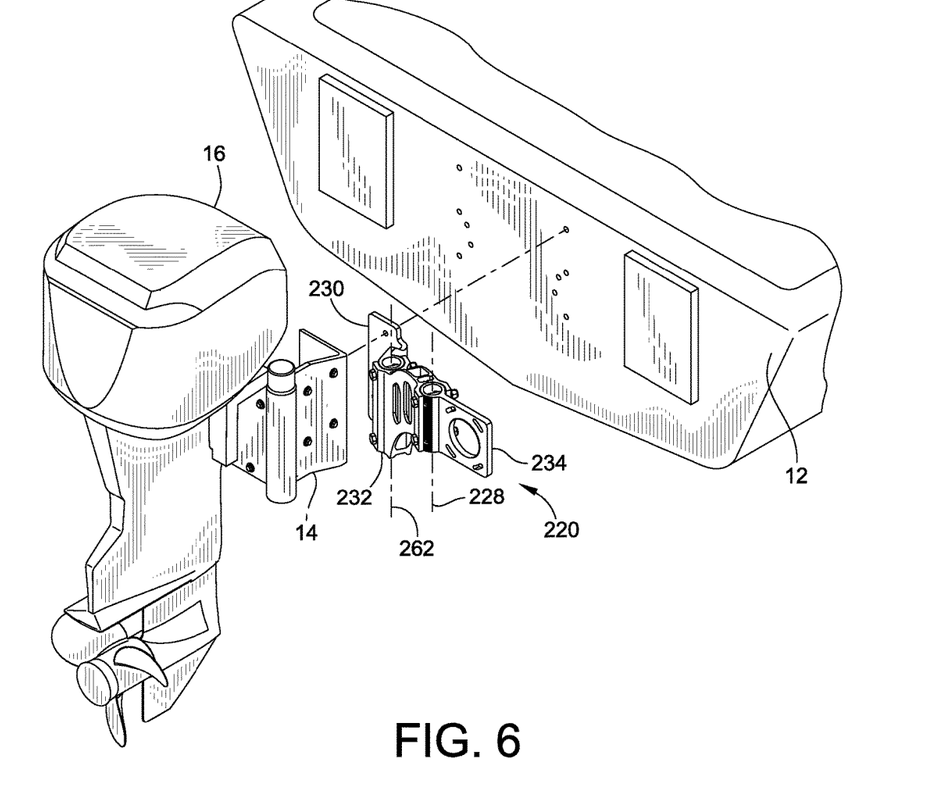
FIG. 6 is a partial perspective exploded view of a boat with second embodiment of a mounting bracket according to the teachings of the present invention.

Turning now to FIG. 6, an alternate embodiment of a mounting bracket 220 is illustrated. This mounting bracket 220 is essentially the same as that previously described relative to FIGS. 1-5, with the exception that the same includes a first member 230 which mounts in a "sandwich-style" configuration between the transom 12 and the jackplate 14, between the jackplate 14 and outboard motor 16, or between the outboard motor 16 and the transom 12 in configurations that omit a jackplate 14. In the illustrated embodiment, mounting bracket 220 is mounted proximate the starboard side of jackplate 14 and between jackplate 14 and transom 12. Mounting bracket 220 also includes second member 234, and arm 232. Arm 232 is adjustable about axis 226 relative to first member 230. Second member 234 is adjustable relative to arm 232 about a second axis 228. The adjustment of these elements is achieved in the same manner as that described above relative to FIGS. 1-5.

Figure 7:
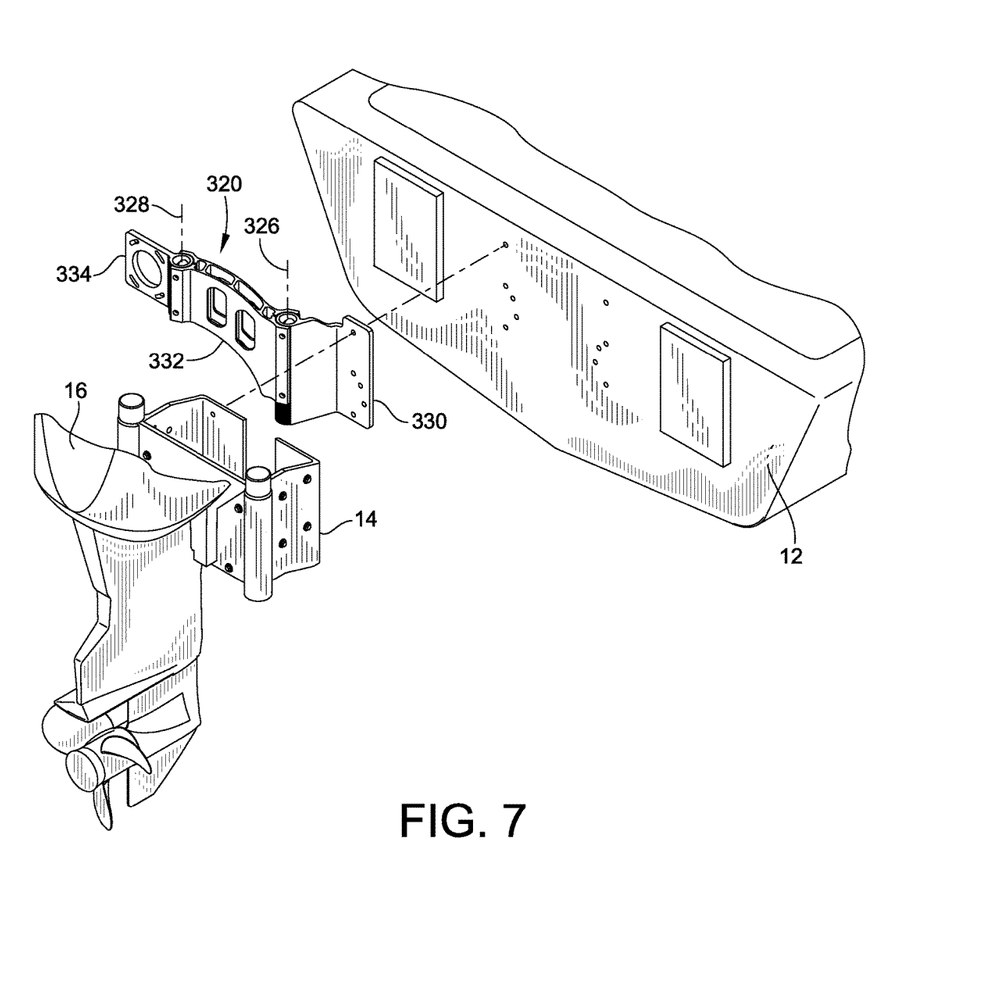
FIG. 7 is a partial perspective exploded view of a boat with third embodiment of a mounting bracket according to the teachings of the present invention.

Turning now to FIG. 7, another embodiment of a mounting bracket 320 is illustrated. Mounting bracket 320 is essentially a mirror image of mounting bracket 220 shown in FIG. 6, and mounts proximate the port side of the jackplate 14 in a sandwich style configuration. Mounting bracket 320 includes a first member 330, arm 332, and second member 334. First member 330 mounts in a "sandwich-style" configuration between transom 12 and jackplate 14. Arm 332 is adjustable about first axis 326 relative to first member 330. Second member 334 is adjustable relative to arm 332 about second axis 328. Such adjustment is achieved in the same manner as that described above relative to FIGS. 1-5.

Those skilled in the art will recognize that the mounting bracket described herein advantageously provides a universal solution for mounting an item of marine equipment to a watercraft. Such a universal mount advantageously eliminates the need for a plurality of mounts which are custom designed to accommodate various watercraft designs and associated with a single item of outboard marine equipment. As a result, the cost of manufacturing an item of outboard marine equipment and its associated mounting bracket is greatly reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting bracket for mounting outboard marine equipment to a watercraft, comprising:
   a first member, a portion of which is configured to mount to an exterior of a watercraft;
   an arm having a first and second end, the first member coupled to the arm at the first end to define a first axis of adjustment;
   a second member which provides a mounting surface for mounting outboard marine equipment to the second member, the second member coupled to the arm at the second end of the arm to define a second axis of adjustment; and
   wherein the arm is adjustable relative to the first member about the first axis to one of a plurality of adjustment positions, and wherein the second member is adjustable relative to the arm about the second axis to one of a plurality of adjustment positions.

2. The mounting bracket of claim 1, wherein the first member includes a connection portion with a bore extending therethrough and a flange portion extending away from the connection portion, the connection portion received in a first clamping portion of the arm at the first end thereof, the flange portion defining a mounting surface for mounting the mounting bracket to the watercraft.

3. The mounting bracket of claim 2, wherein the connection portion includes a plurality of adjustment teeth formed on an exterior thereof, and wherein the first clamping portion includes a recess for receiving the connection portion with a plurality of adjustment teeth formed therein, the adjustment teeth of the connection portion and the adjustment teeth of the recess defining the plurality of adjustment positions of the arm relative to the first member.

4. The mounting bracket of claim 1, wherein the second member includes a connection portion with a bore extending therethrough and a flange portion extending away from the connection portion, the connection portion received in a second clamping portion of the arm at the second end thereof, the flange portion defining a mounting surface for mounting outboard marine equipment thereto.

5. The mounting bracket of claim 4, wherein the connection portion includes a plurality of adjustment teeth formed on an exterior thereof, and wherein the second clamping portion includes a recess for receiving the connection portion with a plurality of adjustment teeth formed therein, the adjustment teeth of the connection portion and the adjustment teeth of the recess defining the plurality of adjustment positions of the second member relative to the arm.

6. A mounting bracket for mounting outboard marine equipment to a watercraft, comprising:
 a first member, a portion of which is configured to mount to an exterior of a watercraft;
 an arm having a first and second end, the first member coupled to the arm at the first end to define a first axis of adjustment;
 a second member which provides a mounting surface for mounting outboard marine equipment to the second member, the second member coupled to the arm at the second end of the arm to define a second axis of adjustment;
 wherein the arm is adjustable relative to the first member about the first axis to one of a plurality of adjustment positions, and wherein the second member is adjustable relative to the arm about the second axis to one of a plurality of adjustment positions;
 wherein the first member includes a connection portion with a bore extending therethrough and a flange portion extending away from the connection portion, the connection portion received in a first clamping portion of the arm at the first end thereof, the flange portion defining a mounting surface for mounting the mounting bracket to the watercraft;
 wherein the connection portion includes a plurality of adjustment teeth formed on an exterior thereof, and wherein the first clamping portion includes a recess for receiving the connection portion with a plurality of adjustment teeth formed therein, the adjustment teeth of the connection portion and the adjustment teeth of the recess defining the plurality of adjustment positions of the arm relative to the first member; and
 wherein at least one pair of aligned slots are formed through the connection portion, and at least one pair of aligned apertures are formed through the first clamping portion, the at least one pair of aligned apertures alignable with the at least one pair of aligned slots along a mounting axis, and further comprising a mounting bolt extending through the at least one pair of aligned slots and the at least one pair of aligned apertures along the mounting axis.

7. The mounting bracket of claim 6, wherein the mounting bolt is radially fixed when received in the at least one pair of aligned apertures, and wherein the mounting bolt is slidable in a circumferential direction within each of the at least one pair of aligned slots.

8. A mounting bracket for mounting outboard marine equipment to a watercraft, comprising:
 a first member, a portion of which is configured to mount to an exterior of a watercraft;
 an arm having a first and second end, the first member coupled to the arm at the first end to define a first axis of adjustment;
 a second member which provides a mounting surface for mounting outboard marine equipment to the second member, the second member coupled to the arm at the second end of the arm to define a second axis of adjustment;
 wherein the arm is adjustable relative to the first member about the first axis to one of a plurality of adjustment positions, and wherein the second member is adjustable relative to the arm about the second axis to one of a plurality of adjustment positions;
 wherein the second member includes a connection portion with a bore extending therethrough and a flange portion extending away from the connection portion, the connection portion received in a second clamping portion of the arm at the second end thereof, the flange portion defining a mounting surface for mounting outboard marine equipment thereto;
 wherein the connection portion includes a plurality of adjustment teeth formed on an exterior thereof, and wherein the second clamping portion includes a recess for receiving the connection portion with a plurality of adjustment teeth formed therein, the adjustment teeth of the connection portion and the adjustment teeth of the recess defining the plurality of adjustment positions of the second member relative to the arm; and
 wherein at least one pair of aligned slots are formed through the connection portion, and at least one pair of aligned apertures are formed through the second clamping portion, the at least one pair of aligned apertures alignable with the at least one pair of aligned slots along a mounting axis, and further comprising a mounting bolt extending through the at least one pair of aligned slots and the at least one pair of aligned apertures along the mounting axis.

9. The mounting bracket of claim 8, wherein the mounting bolt is radially fixed when received in the at least one pair of aligned apertures, and wherein the mounting bolt is slidable in a circumferential direction within each of the at least one pair of aligned slots.

10. A mounting bracket for mounting outboard marine equipment to a watercraft, comprising:
 a first member, a portion of which is configured to mount to a motor mount of the watercraft;
 an arm having a first and second end, the first member coupled to the arm at the first end to define a first axis of adjustment, the arm incrementally adjustable relative to the first member through rotation of the arm about the first axis;
 a second member which provides a mounting surface for mounting outboard marine equipment to the second member, the second member coupled to the arm at the second end of the arm to define a second axis of adjustment, the second member incrementally adjustable relative to the arm through rotation of the second member about the second axis; and
 wherein one increment of adjustment of the arm relative to the first member about the first axis angularly displaces the arm relative to the first member a first angular value, and wherein one increment of adjustment of the second member relative to the arm about the second axis angularly displaces the second member relative to the arm a second angular value that is equivalent to the first angular value.

11. The mounting bracket of claim 10, wherein each of the first member and the first end of the arm include a plurality of adjustment teeth configured to mesh together to define a plurality of incrementally adjustable positions of the arm relative to the first member.

12. The mounting bracket of claim 10, wherein each of the second member and the second end of the arm include a plurality of adjustment teeth configured to mesh together to define a plurality of incrementally adjustable positions of the second member relative to the arm.

13. A mounting bracket for mounting outboard marine equipment to a watercraft, comprising:
    a first member, a portion of which is configured to mount to a motor mount of the watercraft;
    an arm having a first and second end, the first member coupled to the arm at the first end to define a first axis of adjustment, the arm incrementally adjustable relative to the first member through rotation of the arm about the first axis;
    a second member which provides a mounting surface for mounting outboard marine equipment to the second member, the second member coupled to the arm at the second end of the arm to define a second axis of adjustment, the second member incrementally adjustable relative to the arm through rotation of the second member about the second axis;
    wherein one increment of adjustment of the arm relative to the first member about the first axis angularly displaces the arm relative to the first member a first angular value, and wherein one increment of adjustment of the second member relative to the arm about the second axis angularly displaces the second member relative to the arm a second angular value that is equivalent to the first angular value
    wherein each of the first member and the first end of the arm include a plurality of adjustment teeth configured to mesh together to define a plurality of incrementally adjustable positions of the arm relative to the first member; and
    further comprising at least one mounting bolt connecting the first member to the first end of the arm, wherein the at least one mounting bolt axially fixes the arm relative to the first member via radial passage through both the arm and the first member.

14. A mounting bracket for mounting outboard marine equipment to a watercraft, comprising:
    a first member, a portion of which is configured to mount to a motor mount of the watercraft;
    an arm having a first and second end, the first member coupled to the arm at the first end to define a first axis of adjustment, the arm incrementally adjustable relative to the first member through rotation of the arm about the first axis;
    a second member which provides a mounting surface for mounting outboard marine equipment to the second member, the second member coupled to the arm at the second end of the arm to define a second axis of adjustment, the second member incrementally adjustable relative to the arm through rotation of the second member about the second axis;
    wherein one increment of adjustment of the arm relative to the first member about the first axis angularly displaces the arm relative to the first member a first angular value, and wherein one increment of adjustment of the second member relative to the arm about the second axis angularly displaces the second member relative to the arm a second angular value that is equivalent to the first angular value;
    wherein each of the second member and the second end of the arm include a plurality of adjustment teeth configured to mesh together to define a plurality of incrementally adjustable positions of the second member relative to the arm; and
    further comprising at least one mounting bolt connecting the second member to the second end of the arm, wherein the at least one mounting bolt axially fixes the second member relative to the arm via radial passage through both the arm and the second member.

15. A method for mounting an item of outboard marine equipment to a watercraft using a mounting bracket, comprising the steps of:
    mounting a first end of the mounting bracket to a portion of the watercraft;
    mounting the item of outboard marine equipment to a second end of the mounting bracket;
    angularly adjusting an arm of the mounting bracket relative to a first member of the mounting bracket about a first axis; and
    angularly adjusting a second member of the mounting bracket relative to the arm about a second axis to position the item of outboard marine equipment at a fixed distance relative to the watercraft.

16. The method of claim 15, wherein the step of mounting the first end includes mounting the first member such that it is in contact with a motor mount of the watercraft.

17. The method of claim 15, wherein the step of mounting the first end includes mounting the first member such that it is in contact with at least one of motor mount of the watercraft and a transom of the watercraft.

18. The method of claim 15, wherein the step of angularly adjusting the arm relative to the first member includes bringing a plurality of adjustment teeth of the first member into meshed engagement with a plurality of adjustment teeth of the arm.

19. The method of claim 15, wherein the step of angularly adjusting the second member relative to the arm includes bringing a plurality of adjustment teeth of the second member into meshed engagement with a plurality of adjustment teeth of the arm.

* * * * *